United States Patent [19]

Berko

[11] 4,273,499

[45] Jun. 16, 1981

[54] APPARATUS FOR MANIPULATING SIGNATURE BUNDLES

[75] Inventor: Peter Berko, Royal Oak, Mich.

[73] Assignee: D. W. Zimmerman Mfg., Inc., Madison Heights, Mich.

[21] Appl. No.: 63,209

[22] Filed: Aug. 3, 1979

[51] Int. Cl.³ ........................... B65G 7/00; B66C 1/44

[52] U.S. Cl. ............................... 414/626; 294/67 AB; 294/87 R; 294/88; 414/668; 414/672; 414/783

[58] Field of Search ................ 294/63 R, 67 R, 67 A, 294/67 AA, 67 AB, 67 B, 67 BC, 86 R, 87 R, 88, 103 R, 104, 115; 414/620-623, 626, 664-672, 771, 783

[56] References Cited

U.S. PATENT DOCUMENTS

| | | | |
|---|---|---|---|
| 2,682,347 | 6/1954 | Jackson | 414/622 X |
| 2,757,813 | 8/1956 | Adams | 294/104 X |
| 2,775,359 | 12/1956 | Carpenter | 414/621 |
| 2,807,382 | 9/1957 | Schenkelberger | 414/620 |
| 2,869,742 | 1/1959 | Hileman | 414/622 |
| 2,996,205 | 8/1961 | Ulinski | 414/621 |
| 3,223,267 | 12/1965 | Stammen | 294/88 |
| 3,404,792 | 10/1968 | Frieberg | 294/67 R X |
| 4,111,310 | 9/1978 | Stobb | 294/86 R X |

*Primary Examiner*—Johnny D. Cherry

*Attorney, Agent, or Firm*—Allen D. Gutchess, Jr.

[57] ABSTRACT

Apparatus is provided for handling signature bundles. The apparatus is particularly designed to place one signature bundle in end-to-end relationship with another. The apparatus includes a clamping plate at one end of a frame and a pair of pivotal arms at the other end of the frame which can engage and disengage a signature at the end of the bundle without damaging it. This enables a rew signature bundle to be stacked on another one at feeding equipment which separates and collates the bundles with other bundles, by way of example.

8 Claims, 9 Drawing Figures

APPARATUS FOR MANIPULATING SIGNATURE BUNDLES

This invention relates to apparatus for handling a signature bundle and enabling it to be stacked in end-to-end relationship with another bundle.

In the printing and graphics arts industries, apparatus is employed to clamp and lift bundles of signatures and transport them between various locations. By way of example, the bundles can be moved from stacking equipment which stacks the signatures into bundles to feeding equipment which separates and collates the bundles with other bundles.

In magazine types of collators, the signatures are stacked in vertical bundles and the signatures are rapidly stripped from the bottom of the bundles. In such instances, it is often desirable to place another bundle of signatures on the one being collated before the latter one is used up, in order to provide a continuous operation. However, the bundles of signatures have rigid plates at each end to avoid damage to the end signatures. Consequently, it has not been possible to stack one bundle on another since the rigid plate therebetween would interfere with the operation of the collator or other machine processing the signatures.

The present invention provides apparatus for manipulating signature bundles in a manner such that one bundle can be placed on another. The apparatus includes a frame having a rigid clamping plate or pad at one end and a pair of pivotable arms at the other end which can be swung from a position supporting an end of the bundle to a position clear of the bundle. The pivotable arms are equipped with rollers designed to engage the signature with rolling contact and also to engage the top signature of the lower bundle with similar contact. In this manner, the end signatures are not damaged by the apparatus and a signature bundle with a lower bare signature can be thus stacked directly on the top signature of a lower bundle.

In manipulating the bundles, a signature bundle at a stacker can be engaged between pivotable arms and the clamping plate and the bundle then carried to a suitable horizontal surface, such as a table. The clamping plate pressure is then released and the two rigid plates at the ends of the bundle then removed. The bare bundle is then reclamped, moved to an existing bundle, and swung to a vertical position with the pivotable arms below the bundle. With the bundle positioned over the previous bundle, the pressure on the clamping plate is released and the pivotal arms are swung out of the way with the upper bundle then dropping down a short distance onto the previous bundle. Rollers are positioned on both edges of each of the pivotable arms so that one row of rollers contacts the lower signature of the bundle it is supporting and at the same time the other row contacts the upper signature of the previous bundle.

It is, therefore, a principal object of the invention to provide a signature bundle handler which can manipulate a signature bundle with bare end signatures without damage thereto.

Other objects and advantages of the invention will be apparent from the following detailed description of a preferred embodiment thereof, reference being made to the accompanying drawings, in which.

Figure 1:
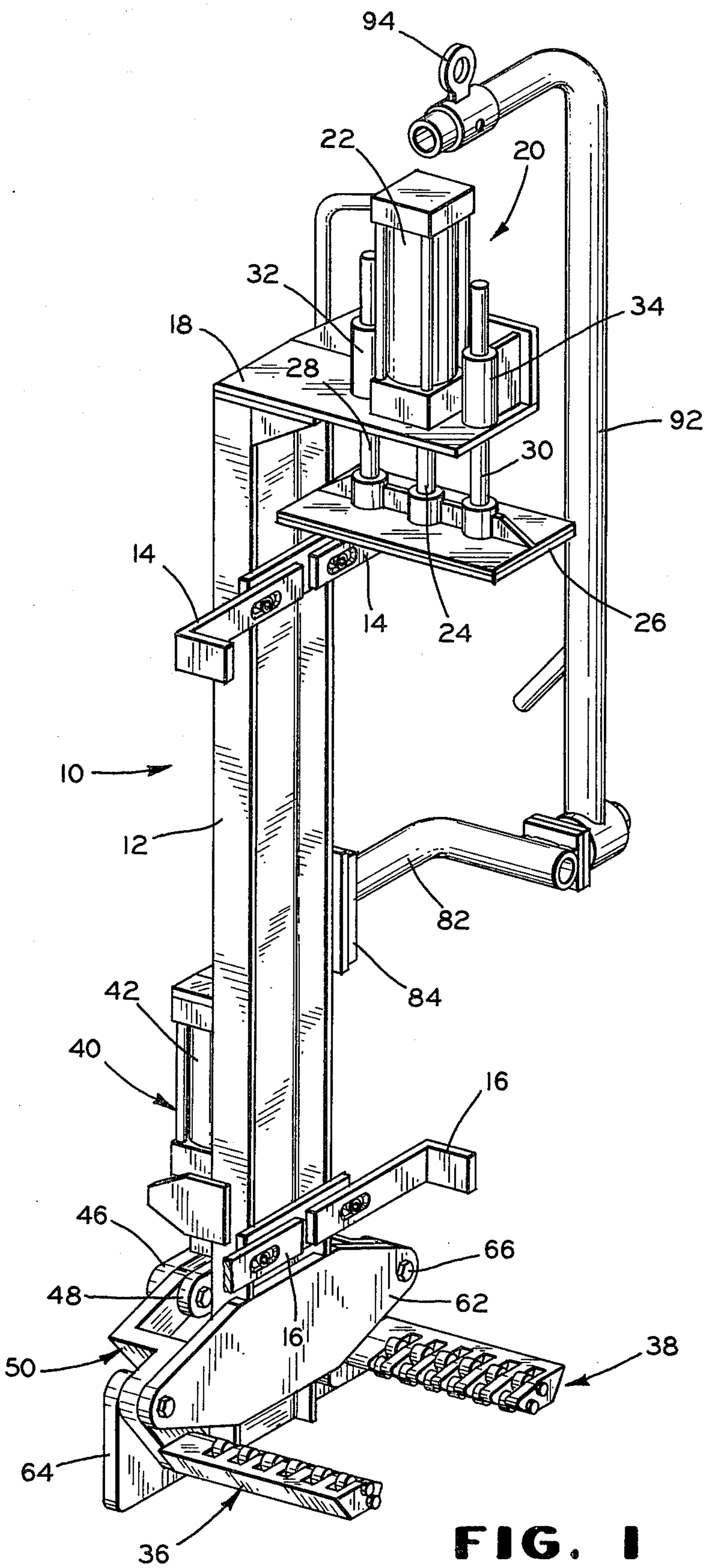
FIG. 1 is a somewhat schematic view in perspective, with parts broken away, of apparatus embodying the invention.

Referring to the drawings, and particularly to FIG. 1, signature bundle handling apparatus according to the invention is indicated at 10. The apparatus includes an upright frame member 12 having a pair of adjustable upper positioning arms 14 and lower positioning arms 16 which help align the apparatus 10 with a bundle of signatures. A horizontal plate 18 is rigidly affixed to the upper end of the frame member 12 with a fluid-operated ram 20 affixed thereto. The ram includes a cylinder 22 located above the plate 18 and a piston rod 24 extending through and below the plate 18. A clamping plate or member 26 is affixed to the piston rod 24 for movement toward and away from the plate 18. Two guide rods 28 and 30 are also affixed to the clamping plate 26 and extend through the plate 18 to bushings 32 which are affixed to the upper side of the plate 18 on opposite sides of the cylinder 22. The guide rods maintain the clamping plate 26 perpendicular to the piston rod 24.

Figure 3:
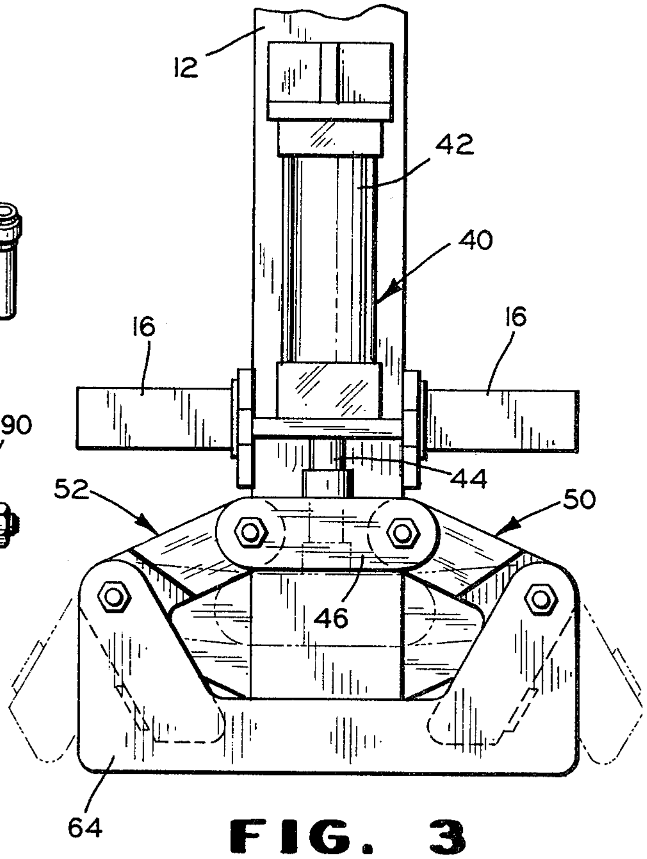
FIG. 3 is an enlarged, fragmentary rear view in elevation of a lower portion of the apparatus of FIGS. 1 and 2.
Figure 4:
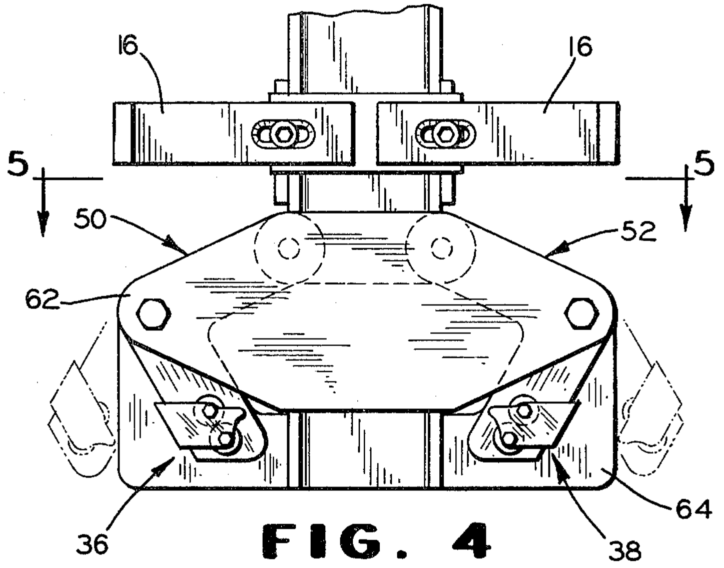
FIG. 4 is an enlarged, fragmentary front view in elevation of a lower portion of the apparatus of FIGS. 1 and 2.

Two pivotable arms 36 and 38 are located at the lower end of the frame member 12. The arms are moved by a fluid-operated ram 40 mounted on the back of the upright frame member 12 and including a cylinder 42 and a piston rod 44 extending downwardly therefrom. A pair of parallel, spaced bars 46 and 48 are affixed to the lower end of the piston rod 44 and extend perpendicularly thereto. L-shaped lever arms 50 and 52 have upper ends pivotably affixed to the ends of the bars 46 and 48 by bolts 54 and nuts 56. The lever arms also have offsets 58 and 60 terminating in intermediate portions which are pivotably affixed to a front plate 62 and a rear plate 64 by bolts 66 and nuts 68. The plates 62 and 64 are suitably affixed to the front and the rear of the frame member 12, respectively. The lower ends of the lever arms 50 and 52 below the intermediate pivot points have the pivotable arms 36 and 38 suitably affixed thereto and extending outwardly a distance somewhat less than the length of the clamping plate 26. The arms 36 and 38 pivot about the intermediate pivot points of the lever arms 50 and 52 and their level does not change appreciably relative to the signature bundler handler 10 as they move between inner and outer positions, as shown in FIGS. 3 and 4.

Figure 5:
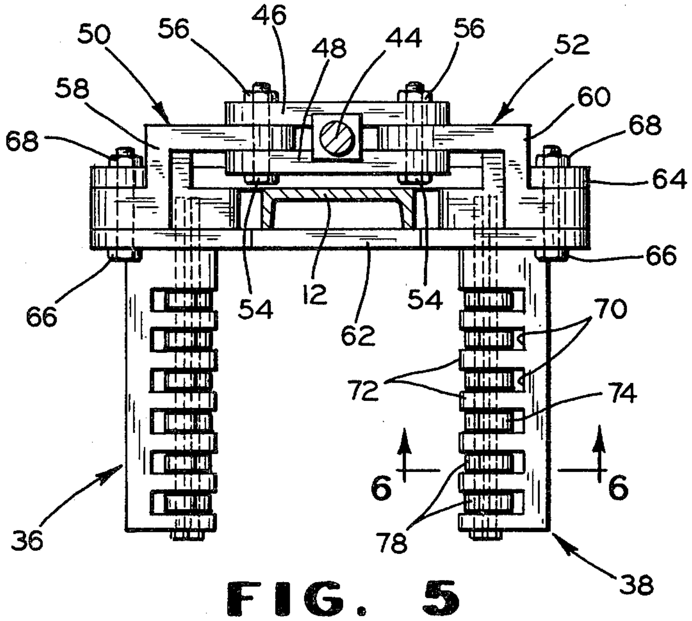
FIG. 5 is a view in horizontal cross section, taken along the line 5—5 of FIG. 4.
Figure 6:
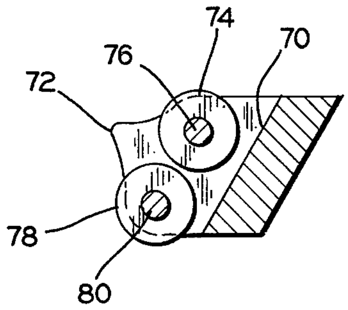
FIG. 6 is a view in transverse cross section, taken along the line 6—6 of FIG. 5.

As shown particularly in FIGS. 5 and 6, the pivotable arms 36 and 38 each have a plurality of notches 70 facing toward the other pivotable arm with dividing walls 72 located therebetween. An upper row of rollers 74 are located in the notches 70 and extend upwardly beyond the upper edges of the dividing walls 72, being rotatably mounted on an axle 76. Similarly, a lower row of rollers 78 are located in the notches 70 and extend downwardly below the lower edges of the dividing walls 72. These are rotatably mounted on a lower axle 80. The axles 76 and 80 can extend through the lever arms 50 and 52 where they can be affixed by nuts (not shown) located in recess in the rear surfaces of the lever arms.

Figure 2:
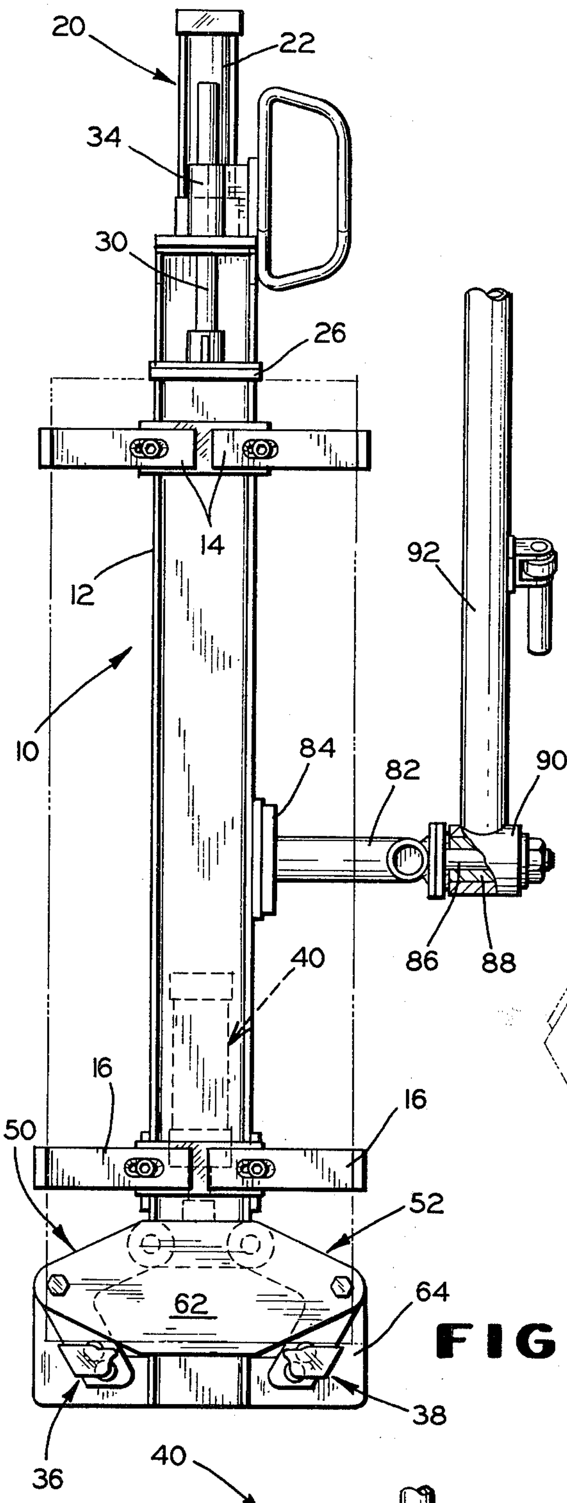
FIG. 2 is a front view in elevation of the apparatus of FIG. 1.
Figure 7:
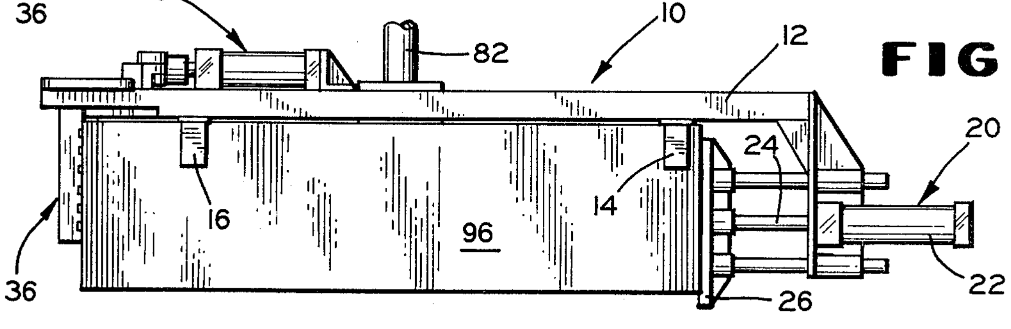
FIG. 7 is a somewhat schematic side view in elevation of the apparatus of FIGS. 1 and 2 shown engaging a signature bundle.

Referring particularly to FIGS. 1 and 2, the upright frame member 12 has an L-shaped arm 82 affixed to an intermediate portion thereof by mounting plates 84 and has a stub shaft 86 extending outwardly from the other end thereof. The stud shaft 86 is rotatably received in a bearing sleeve 88 located in a cylinder 90 affixed to the lower end of an L-shaped linking arm 92 having a loop 94 at the upper end thereof to be affixed to a hoist hook. This arrangement between the hoist and the bundle handler 12 enables the frame member 12 and the affixed components to be pivoted between an upright position, as shown in FIG. 1, and a horizontal position, as shown in FIG. 7, with the clamping plate 26 and the pivotable arms 36 and 38 extending downwardly below the frame member 12.

In the operation of the bundle handler 10, the apparatus is moved by a hoist over to stacking equipment where a signature bundle is picked up by aligning the bundler handler with the bundle, with the pivotable arms 36 and 38 at one end of the bundle and the clamping plate 26 at the other end. The clamping plate 26 is then moved toward the arms 36 and 38 to grasp the bundle. At this time, the bundle has rigid plates at both ends to prevent damage to the outer signatures. The bundle is then moved by the bundle handler and the hoist over to a suitable horizontal surface where the bundle is swung to a horizontal position and is positioned on and supported by the surface. The pressure on the ram 20 of the clamping plate 26 is then released and the rigid plates at the ends of the bundle are removed. At this time the pressure to the ram 20 is again applied to clamp a bare bundle 96, as shown in FIG. 7, between the clamping plate 26 and the pivotable arms 36 and 38.

Figure 8:
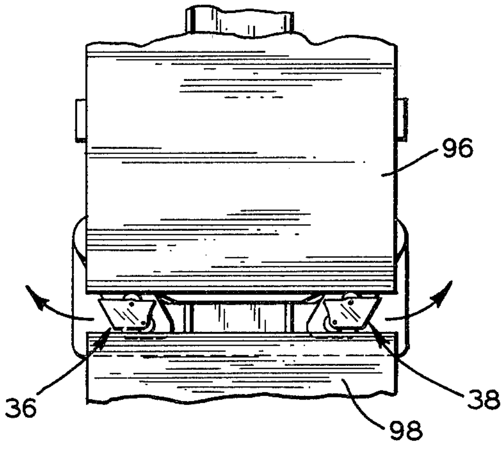
FIG. 8 is a fragmentary front view in elevation of the lower portion of the apparatus of FIGS. 1 and 2 shown about to deposit an upper signature bundle on a lower one.

The bare bundle 96 is then swung to an upright position by moving the signature bundle handler to that position around the shaft 86 and the bushing 88. The bundle handler is then moved by the hoist to collating equipment or other equipment where the bare bundle 96 is to be placed upon an old, partially spent, bundle 98. The bundle 96 is lowered until the lower rollers 78 of the pivotable arms 36 and 38 engage the upper signature of the lower bundle 98, as shown in FIG. 8. The upper row of rollers 76, of course, is engaging and supporting the lower signature of the upper bare bundle 96. The upper bundle is only spaced from the lower bundle by a distance approximately equal to the thickness of the pivotable arms 36 and 38.

Figure 9:
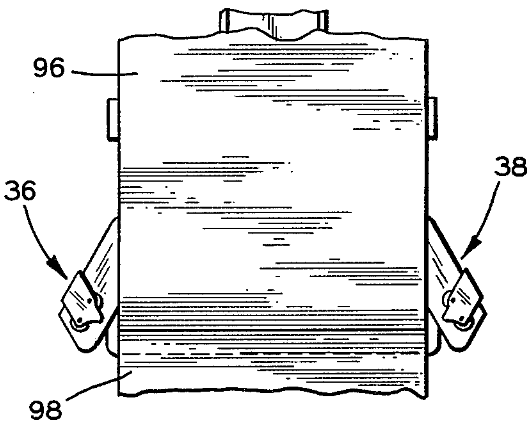
FIG. 9 is a view similar to FIG. 8 but with the upper bundle deposited and supported on the lower bundle.

In this position, fluid is supplied to the upper end of the cylinder 42 to cause the piston rod 44 to extend therefrom. This moves the bars 46 and 48 downwardly and causes the L-shaped lever arms 50 and 52 to pivot about the intermediate pivots formed by the bolts 66 and the nut 68. The pivotable arms 36 and 38 thereby swing outwardly to the position of FIG. 9 in which they clear the bundles 96 and 98. By this time, the upper bundle has moved down into contact with the lower bundle 98. At the same time, the roller engagement with the upper and lower bare signatures does not harm these signatures or damage them. Consequently, the upper bare signature bundle 96 can be moved downwardly onto the upper signature of the lower bundle 98 and the operation of the collating equipment is continued without interruption.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. Apparatus for handling signature bundles comprising an elongate frame member, clamping means carried by one end of said frame member for engaging and releasing an end of a signature bundle, two pivotable arms, said pivotable arms including an upper row of rollers for engaging the other end of the signature bundle, said pivotable arms also including a lower row of rollers for engaging an upper end of another signature bundle, means pivotally connecting said arms to the other end of said frame member, and moving means connected to said pivotal connecting means for moving said pivotable arms between a position for engaging the other end of the signature bundle and a position clear of the signature bundle.

2. Apparatus according to claim 1 characterized by means pivotally connecting an intermediate portion of said elongate frame member to a hoist hook to enable said frame member to swing between horizontal and vertical positions.

3. Apparatus for handling signature bundles comprising an elongate frame member, a clamping member, first fluid-operated means connecting said clamping member to one end of said frame member for causing said clamping member to engage and release an end of a signature bundle, two pivotable arms, each of said pivotable arms including an upper row of rollers for engaging the other end of the signature bundle, said rollers in each of said rows being rotatable on an axis which is parallel to the pivot axis of the associated arm, each of said pivotable arms also including a lower row of rollers for engaging an upper end of another signature bundle, said rollers in each of said lower row being rotatable on an axis which is parallel to the pivot axis of the associated arm, lever means pivotally connecting said arms to the other end of said frame member, second fluid-operated means connected to said lever means for moving said pivotable arms between a position for engaging the other end of the signature bundle and a position clear and to the sides of the signature bundle.

4. Apparatus according to claim 3 characterized by means affixed to an intermediate portion of said elongate frame member for pivotally connecting said frame member to a hoist hook to enable said frame member to swing between horizontal and vertical positions.

5. Apparatus for handling signature bundles comprising an elongate frame member, clamping means carried by one end of said frame member for engaging and releasing an end of a signature bundle, pivotable arms located at the other end of said frame member, levers having ends affixed to said pivotable arms and intermediate points affixed to said frame member, means connected to said levers for moving said pivotable arms between positions for engaging the other end of the signature bundle and positions clear and to the side of the signature bundle, and means pivotally connecting an intermediate portion of said elongate frame member to a hoist hook to enable said frame member to swing between a position in which a signature bundle engaged between said clamping means and said arms is vertical and a position in which the signature bundle is horizontal with the elongate frame member above the bundle and the bottom of the bundle is entirely exposed.

6. Apparatus according to claim 5 characterized by each of said pivotable arms including an upper row of rollers for engaging the other end of the signature bundle, said rollers in each of said rows rotatable on an axis which is parallel to the pivot axis of the associated arm.

7. Apparatus according to claim 6 characterized by each of said pivotable arms including a lower row of rollers for engaging an upper end of another signature bundle, said rollers in each of said lower rows being rotatable on an axis which is parallel to the pivot axis of the associated arm.

8. Apparatus according to claim 5 characterized by said pivotally connecting means comprising an arm affixed to the intermediate portion of said elongate frame and extending outwardly therefrom, and a connecting arm having one end portion pivotally connected to an outer end portion of the arm and another end portion having means to receive the hoist hook.

* * * * *